(12) United States Patent
Lupowitz

(10) Patent No.: US 12,511,361 B2
(45) Date of Patent: *Dec. 30, 2025

(54) INTELLIGENT GALLERY MANAGEMENT FOR BIOMETRICS

(71) Applicant: Alclear, LLC, New York, NY (US)

(72) Inventor: Kevin Lupowitz, New York, NY (US)

(73) Assignee: SECURE IDENTITY, LLC, New York, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/522,121

(22) Filed: Nov. 28, 2023

(65) Prior Publication Data

US 2024/0095325 A1 Mar. 21, 2024

Related U.S. Application Data

(63) Continuation of application No. 17/485,442, filed on Sep. 26, 2021, now Pat. No. 12,346,419, which is a
(Continued)

(51) Int. Cl.
G06F 21/32 (2013.01)
G06F 18/211 (2023.01)
(Continued)

(52) U.S. Cl.
CPC ............ *G06F 21/32* (2013.01); *G06F 18/211* (2023.01); *G06F 18/28* (2023.01); *G06V 10/772* (2022.01);
(Continued)

(58) Field of Classification Search
CPC ........ G06F 21/32; G06F 21/604; G06F 21/62; G06F 2221/2111; G06F 2221/2113; G06F 16/22; G06F 21/316; G06F 21/34; G06F 21/6254; G06F 16/9535; G06F 18/22; G06F 21/36; G06F 21/6218; G06F 21/6263; G06F 3/04817; G06F 3/04842; G06F 18/256; G06F 21/602; G06F 21/6245; G06F 2221/2115; G06F 2221/2101; G06F 16/2455; H04L 41/5009; A61B 5/11;
(Continued)

(56) References Cited

U.S. PATENT DOCUMENTS 10,142,333 B1 * 11/2018 Griffin ................. H04L 9/3231
10,621,419 B2 * 4/2020 Kocher ................ G06V 40/172
(Continued)

*Primary Examiner* — Golam Sorowar
(74) *Attorney, Agent, or Firm* — Brownstein Hyatt Farber Schreck, LLP

(57) ABSTRACT

A system provides intelligent gallery management for biometrics. A first gallery is obtained that includes biometric and/or other information on a population of people. An application is identified. A subset of the population of people is identified based on the application. A second gallery is derived from the first gallery by pulling the information for the subset of the population of people without pulling the information for the population of people not in the subset. Biometric identification (such as facial recognition) for the application may then be performed using the second gallery rather than the first gallery. In this way, the system is improved as less time is required for biometric identification, fewer device resources are used, and so on.

20 Claims, 7 Drawing Sheets

Related U.S. Application Data continuation of application No. 17/316,062, filed on May 10, 2021, now Pat. No. 11,495,056, which is a continuation of application No. 16/731,154, filed on Dec. 31, 2019, now Pat. No. 11,037,009, which is a continuation of application No. 16/048,094, filed on Jul. 27, 2018, now Pat. No. 10,614,331.

(60) Provisional application No. 62/538,348, filed on Jul. 28, 2017.

(51) Int. Cl.
    *G06F 18/28*     (2023.01)
    *G06V 10/772*     (2022.01)
    *G06V 10/94*     (2022.01)
    *G06V 40/12*     (2022.01)
    *G06V 40/16*     (2022.01)
    *G06V 40/50*     (2022.01)

(52) U.S. Cl.
    CPC .......... *G06V 10/94* (2022.01); *G06V 40/1365* (2022.01); *G06V 40/173* (2022.01); *G06V 40/50* (2022.01)

(58) Field of Classification Search
CPC .. G06V 40/172; G06V 40/70; G06V 40/1353; G06V 40/1371; G06V 40/1388; G06V 40/1359; G06V 40/1365; G06V 40/1394; G06V 40/12; G06V 40/13; G06V 40/1341; G06V 40/1347; G06V 40/1376; G06V 40/1382; G06V 40/16; G06V 40/19; G06V 40/67; G06V 10/141; G06V 10/993; G06V 10/143; G06V 10/28; G06V 10/32; G06V 30/242
USPC .......................................... 345/212; 713/162
See application file for complete search history.

(56) References Cited

U.S. PATENT DOCUMENTS

| | | | |
|---|---|---|---|
| 10,956,718 B2 * | 3/2021 | Xu | G06F 21/36 |
| 11,138,430 B2 * | 10/2021 | Utsumi | G06V 10/30 |
| 2016/0328700 A1 * | 11/2016 | Bortolotto | G06Q 20/326 |
| 2017/0228804 A1 * | 8/2017 | Soni | H04L 67/535 |
| 2018/0039990 A1 * | 2/2018 | Lindemann | G06V 40/19 |
| 2018/0157896 A1 * | 6/2018 | Kocher | G06V 10/772 |
| 2025/0053629 A1 * | 2/2025 | Tussy | G06V 40/50 |

* cited by examiner

INTELLIGENT GALLERY MANAGEMENT FOR BIOMETRICS

CROSS-REFERENCE TO RELATED APPLICATION(S)

This application is a continuation patent application of U.S. patent application Ser. No. 17/485,442, filed Sep. 26, 2021 and titled "Intelligent Gallery Management for Biometrics," which is a continuation patent application of U.S. patent application Ser. No. 17/316,062, filed May 10, 2021, and titled "Intelligent Gallery Management for Biometrics," now U.S. Pat. No. 11,495,056, which is a continuation patent application of U.S. patent application Ser. No. 16/731,154, filed Dec. 31, 2019, and titled "Intelligent Gallery Management for Biometrics," now U.S. Pat. No. 11,037,009, which is a continuation patent application of U.S. patent application Ser. No. 16/048,094, filed Jul. 27, 2018 and titled "Intelligent Gallery Management for Biometrics," now U.S. Pat. No. 10,614,331, which is a nonprovisional patent application of and claims the benefit of U.S. Provisional Patent Application No. 62/538,348, filed Jul. 28, 2017 and titled "Intelligent Gallery Management for Biometrics," the disclosures of which are hereby incorporated herein by reference in their entireties.

FIELD

The described embodiments relate generally to biometrics. More particularly, the present embodiments relate to intelligent gallery management for biometrics.

BACKGROUND

Biometric identification systems may identify people using biometrics. Biometrics may include fingerprints, irises, eyes, faces, voices, gaits, pictures, or other identifying characteristics about a person. A biometric identification system may capture a biometric using a biometric reader and identify a person by comparing the captured information against stored information. For example, a camera may capture an image of a fingerprint and compare the image of the fingerprint against stored fingerprint images.

SUMMARY

The present disclosure relates to techniques for intelligent gallery management for biometrics. A first gallery may be obtained that includes biometric and/or other information on a population of people. An application may be identified. A subset of the population of people may be identified based on the application. A second gallery may be derived from the first gallery by pulling the information for the subset of the population of people without pulling the information for the population of people not in the subset. Biometric identification (such as facial recognition) for the application may then be performed using the second gallery rather than the first gallery. In this way, a device or system that performs such a method may be improved as less time may be required for biometric identification, fewer device resources may be used, and so on.

In various implementations, an intelligent biometric gallery management system includes at least one non-transitory storage medium that stores instructions and at least one processor. The at least one processor executes the instructions to obtain a biometric gallery that includes biometric information for a population; ascertain an application for which to use the biometric gallery to identify people; identify a subset of the population based on the application; derive, from the biometric gallery, an application specific biometric gallery for the application that includes the biometric information for the subset of the population; and use the application specific biometric gallery to identify the people for the application.

In some examples, the at least one processor determines a person was not identified using the application specific biometric gallery and communicates with the biometric gallery to identify the person. In various such examples, the application specific biometric gallery is stored locally and the biometric gallery is stored remotely. In other such examples, the at least one processor adds the biometric information for the person to the application specific biometric gallery.

In various examples, identification using the application specific biometric gallery is more accurate than identification using the biometric gallery. In some examples, the application is a first application; the application specific biometric gallery is a first application specific biometric gallery; and the at least one processor derives, from the biometric gallery, a second application specific biometric gallery for a second application. In numerous examples, the biometric gallery is at least ten times larger than the application specific biometric gallery.

In some implementations, an intelligent biometric gallery management system includes at least one non-transitory storage medium that stores instructions and at least one processor. The at least one processor executes the instructions to obtain a biometric gallery that includes biometric information for a population; ascertain an application for which to use the biometric gallery to identify people; determine data that is common to a subset of the population to which the application is applicable and is not common to a remainder of the population; derive, from the biometric gallery, an application specific biometric gallery for the application that includes the biometric information that is associated with the data; and provide access to the application specific biometric gallery for biometric identification.

In various examples, the at least one processor updates the application specific biometric gallery. In numerous examples, the at least one processor adds a portion of the biometric information from the biometric gallery to the application specific biometric gallery. In some such examples, the at least one processor adds the portion of the biometric information from the biometric gallery to the application specific biometric gallery upon occurrence of a change to the application, a change to the biometric gallery, or elapse of a time period.

In numerous examples, the at least one processor removes a portion of the application specific biometric gallery. In some such examples, the at least one processor removes the portion of the application specific biometric gallery after adding to the application specific biometric gallery. In various such examples, the at least one processor removes the portion of the application specific biometric gallery to maintain a minimum gallery size.

In numerous implementations, an intelligent biometric gallery management system includes at least one non-transitory storage medium that stores instructions and at least one processor. The at least one processor executes the instructions to obtain a biometric gallery that includes biometric information for a population; create an application specific biometric gallery by pulling the biometric information for a subset of the population from the biometric gallery, the subset of the population associated with an application for which the biometric gallery can be used to identify people; and provide access to the application specific biometric gallery for biometric identification.

In some examples, the application specific biometric gallery is a facial recognition biometric gallery and the at least one processor creates a fingerprint recognition gallery from the biometric gallery. In various examples, the application is identifying ticketed people and the subset of the population is the ticketed people.

In numerous examples, the subset of the population is previously identified people. In some such examples, the at least one processor removes the biometric information for a previously identified person upon elapse of a time period without subsequent identification.

In various examples, the application specific biometric gallery is a first application specific biometric gallery, the at least one processor creates a second application specific biometric gallery from the biometric gallery that is larger than the first application specific biometric gallery, and the second application specific biometric gallery is used for identification upon failure to identify using the first application specific biometric gallery.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

The following disclosure relates to techniques for intelligent gallery management for biometrics. A first gallery may be obtained that includes biometric and/or other information on a population of people. An application may be identified. A subset of the population of people may be identified based on the application. A second gallery may be derived from the first gallery by pulling the information for the subset of the population of people without pulling the information for the population of people not in the subset. Biometric identification (such as facial recognition) for the application may then be performed using the second gallery rather than the first gallery. In this way, a device or system that performs such a method may be improved as less time may be required for biometric identification, fewer device resources may be used, and so on.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
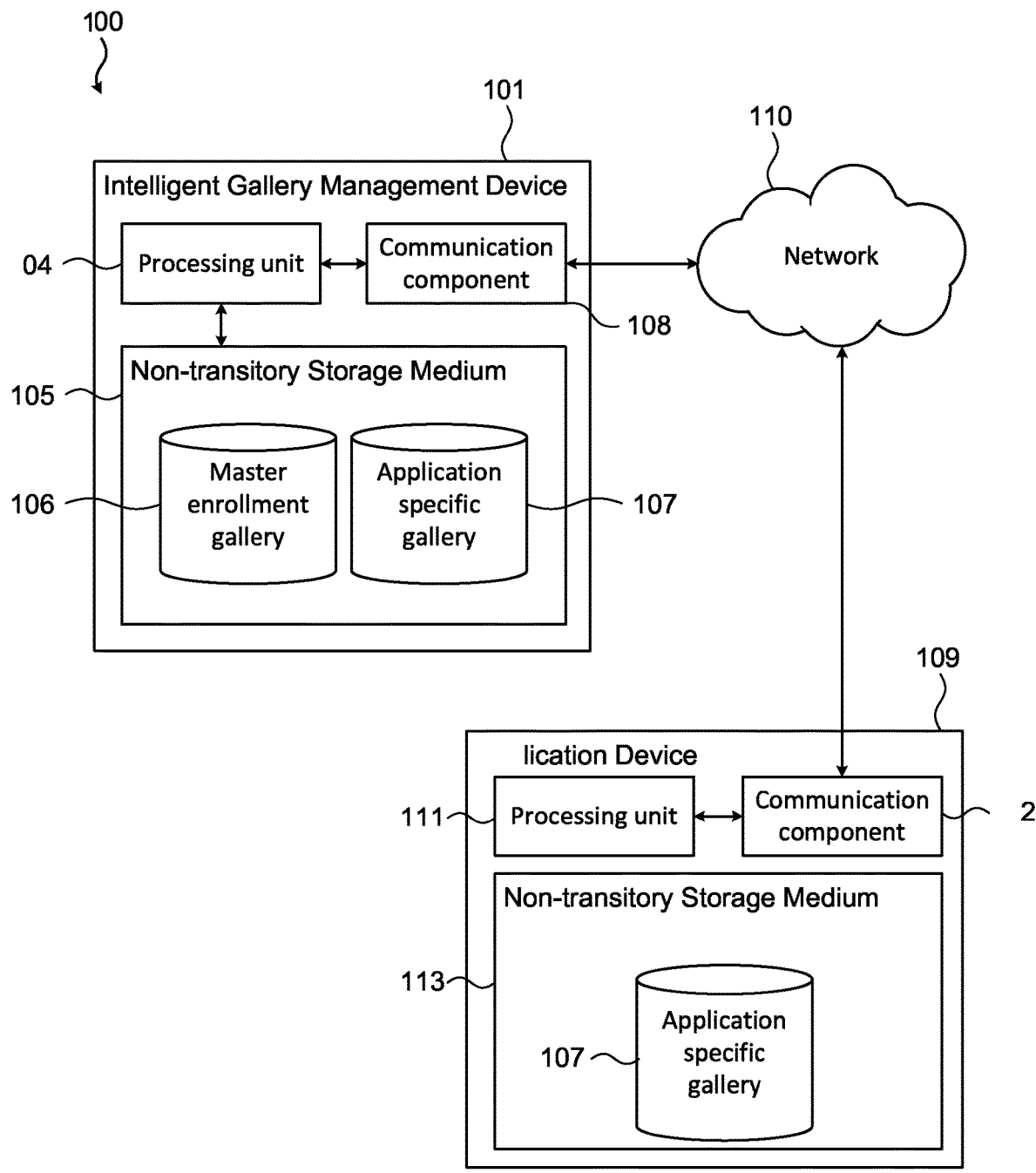
FIG. 1 depicts an Intelligent Gallery Management (IGM) system.

FIG. 1 depicts an Intelligent Gallery Management (IGM) system 100. The system 100 includes an intelligent gallery management device 101. In some implementations, the system 100 may also include an application device 109 with which the intelligent gallery management device 101 is operable to communicate via one or more communication networks 110.

The intelligent gallery management device 101 may create or otherwise obtain a master enrollment gallery 106 that includes biometric and/or other information on a population of people. The intelligent gallery management device 101 may identify one or more applications and identify one or more subsets of the population of people based on the application. The intelligent gallery management device 101 may derive one or more application specific galleries 107 from the master enrollment gallery 106 by pulling the information for the subset of the population of people without pulling the information for the population of people not in the subset. Biometric identification (such as facial recognition) for the application may then be performed (such as by the intelligent gallery management device 101, the application device 109, and so on) using the application specific gallery 107 rather than the master enrollment gallery 106. In this way, a device or system that utilizes these techniques may be improved as less time may be required for biometric identification, fewer device resources may be used, and so on.

The intelligent gallery management device 101 may include one or more processing units 104 or other processors or controllers, non-transitory storage media 105, communication components 108, and/or other components. The non-transitory storage media 105 may store the master enrollment gallery 106 and/or the application specific gallery 107. The processing unit 104 may execute instructions stored in the non-transitory storage media 105 to perform various functions. Such functions may include, but are not limited to, obtaining or creating the master enrollment gallery 106, identifying applications or population subsets, deriving or generating application specific galleries 107, performing biometric identification, communicating with the application device 109 via the communication component 108, and so on.

Similarly, the application device 109 may include one or more processing units 111 or other processors or controllers, non-transitory storage media 113, communication components 112, and/or other components. The non-transitory storage media 113 may store the application specific gallery 107 received from the intelligent gallery management device 101. The processing unit 111 may execute instructions stored in the non-transitory storage media 113 to perform various functions. Such functions may include, but are not limited to, receiving the application specific gallery 107, performing biometric identification, communicating with the intelligent gallery management device 101 via the communication component 112, and so on.

Although the system 100 is illustrated and described as including particular components that perform particular functions, it is understood that this is an example. Various configurations are possible and contemplated without departing from the scope of the present disclosure. These and other features are described in more detail below.

Types of Biometric Matching

Embodiments discussed herein may generally apply to two types of biometric matching, namely "verification" matching and "identification" matching. Verification matches are made to determine a person's identity from among a group of known people culled from a larger pool, while identification matches are made to determine an individual's identity from the larger pool itself (e.g., rather than against a subset of the pool, as in verification).

Verification may assume knowledge of the person presenting themselves, and may verify his or her identity using biometric matching. This process may use a small number of potential matches, as the verification process itself may deeply narrow down the potential matching candidates in advance. This is referred to as 1-to-1 or 1-to-few matching, where "few" may mean less than 20 potential candidates to match against. Verification may be a useful biometric matching solution when there is some knowledge introduced at the exact time of the biometric match, like an identification card with a name or other personal identifier.

In these cases, a workflow may include a) presenting an identification token with a personal identifier on it, b) reading the personal identifier and querying a biometric repository to identify potential matches, c) doing a biometric match against the returned potential matches, and d) responding with a match result. One example of this type of use may be when a person puts their ATM card in a bank machine, and the bank ATM then takes a photo of their face and compares it to the registered face associated with the accounts associated with the presented ATM card. In that case, the facial recognition matching is only comparing the photo to the faces associated with that account, not all faces for all accounts registered at that bank.

Identification may assume no advanced knowledge of who is presenting themselves to be identified. This process may be referred to as 1-to-many or 1-to-n. Identification operations may be much more complex than Verification operations, as they may rely on using the biometrics themselves, and they may search against the entire gallery of enrolled individuals, which may measure into the hundreds of millions of identities.

The process of doing 1-to-many identifications against a group of biometrically enrolled individuals may consist of the following steps:

1. Build a "Gallery" of enrollment templates: a. A Gallery may be a set of biometric templates for enrolled individuals. Each template may be associated with an enrolled identity. b. A Template may be a binary string that is produced by running an algorithm against a biometric image (e.g., fingerprint, iris, face).

2. Place the Gallery in an infrastructure that has a Matching Algorithm: If the gallery size is large, this infrastructure may be very large, as measured by the number of servers or core processes that may run in parallel to handle large gallery size or concurrent identification requests.

3. As Probe images are sent to the matching infrastructure, the matching algorithm may attempt to find an identity within some acceptable matching threshold. A Probe image may be an image taken at the time an individual is to be biometrically identified. It may be turned into a Probe template using the same or similar logic to create gallery templates, and that probe template may be introduced to the matching algorithm and may produce match results.

Challenges to overcome with biometric matching solutions may include 1) Accuracy, 2) Latency, and 3) Throughput.

Accuracy may be determined by a measure of False Positive Rate (FPR) and False Negative Rate (FNR). A given matching algorithm may have defined rates of these measures, and they may be variable based on the number of templates in the enrollment gallery. As the gallery grows, it may be challenging to keep the accuracy stable, perhaps even high.

Latency may mean the time it takes for a single identification operation, and Throughput may mean how many identifications can be done within a given period of time. A given matching algorithm may be optimized for (or may generally address) one or both of these measures.

Type of Biometrics

Some biometrics, by their very nature, may be faster or more accurate than others. Likewise, some biometrics may be slower or less accurate than others. Organizations that choose to implement biometric identification may take many factors into account as to which biometrics they want to consider.

Some major factors to consider may include: Importance of accurate identification, user experience, timeliness of response, and cost of infrastructure.

More mature and "high-touch" biometric matching solutions like fingerprints and irises, may deliver high accuracy and speed with smaller cost to infrastructure, but may deliver such results at the expense of user experience. The biometrics may operate within a well-defined set of quality and acceptance criteria, and the biometric capture devices may be specialized to capture only good images under ideal sets of conditions.

Figure 2:
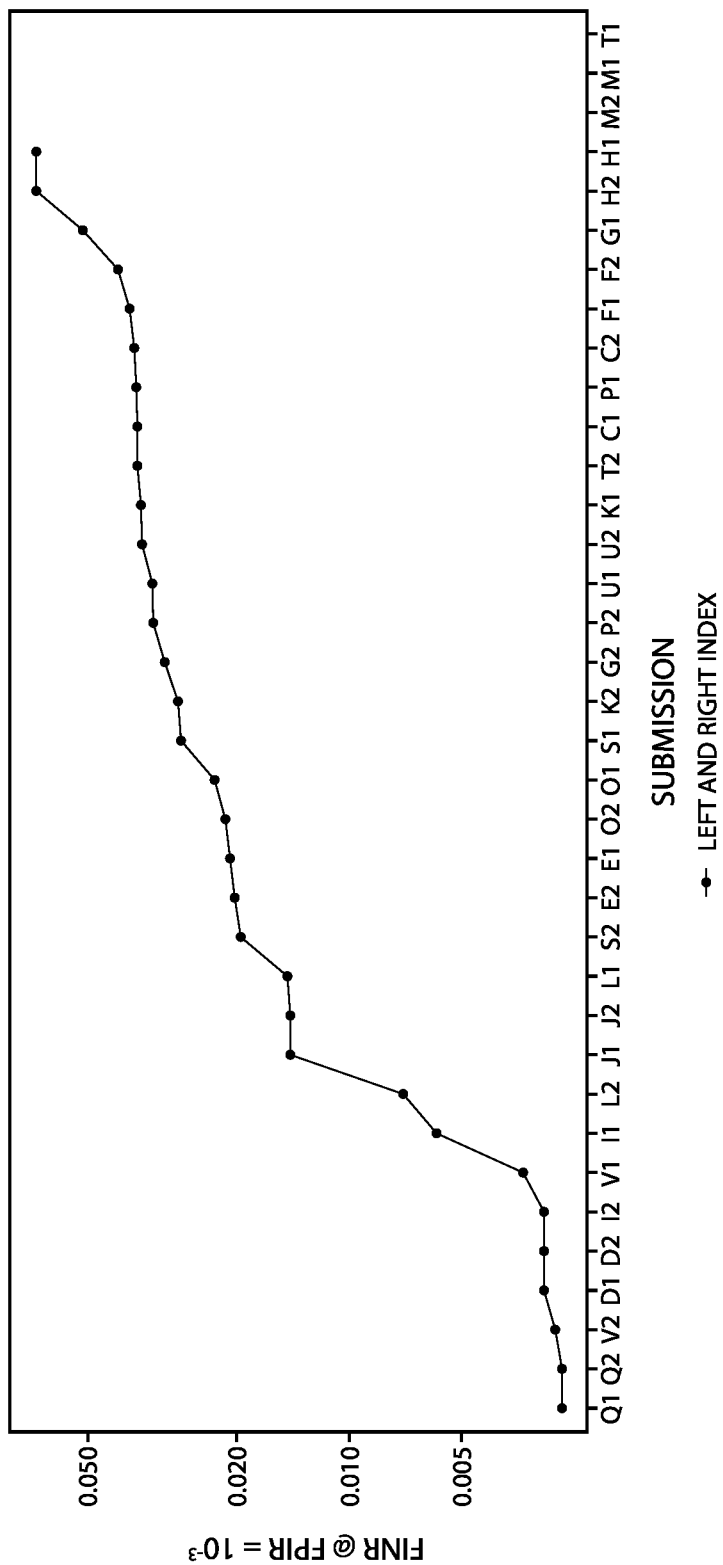
FIG. 2 depicts an example of the high level of accuracy that is achieved through "high-touch" biometric matching.

An example of the high level of accuracy that is achieved through "high-touch" biometric matching is shown in FIG. 2. This is taken from FIG. 15 of NISTIR 8034 (http://nvlpubs.nist.gov/nistpubs/ir/2014/NIST.IR.8034.pdf) 2014 Fingerprint Vendor Technology Evaluation, which is hereby incorporated by reference in its entirety.

This data shows that while pegging the False Positive Identification Rate (FPIR) to 0.001%, the best performing vendor was able to achieve a False Negative Identification Rate (FNIR) of 0.27% searched against an enrollment set of 1.6 million subjects. This is a very high level of accuracy.

Newer, and more desirable "low-touch" biometric matching solutions, like facial recognition, may deliver a very desirable user experience, but may deliver such at the cost of accuracy, speed, and cost to infrastructure. The biggest challenge with some of the "low-touch" biometric matching solutions may be that they are impacted by many more external factors that may impact results, lighting for facial recognition, for example. The combination of both less mature matching algorithms as well as the high level of deviation of biometric images for the same identity because of external conditions may lead to a significant impact in both accuracy and speed for these "low-touch" biometrics. This accuracy drop-off may become very relevant as the size of the gallery grows. In some facial recognition matching algorithms, a gallery size of 50,000 may be where accuracy begins to degrade dramatically to the point of becoming useless. This may be extremely limiting when a desired gallery size of 100 million is desired for an Identification operation.

The following defines systems, methods, apparatuses, and computer program products that may perform processes to take galleries of extremely large size, such as in excess of 100 million, and work with "low-touch" biometrics, in a way that may achieve the accuracy, latency, and throughput results of mature "high-touch" biometrics, without sacrificing on user experience or high cost of infrastructure.

Although the above describes using the techniques herein to achieve accuracy, latency, and throughput results of mature "high-touch" biometrics using "low-touch" biometrics, it is understood that this is an example. In various implementations, techniques discussed herein may be used in the context of any kind of biometrics and/or combination of biometrics.

Figure 3:
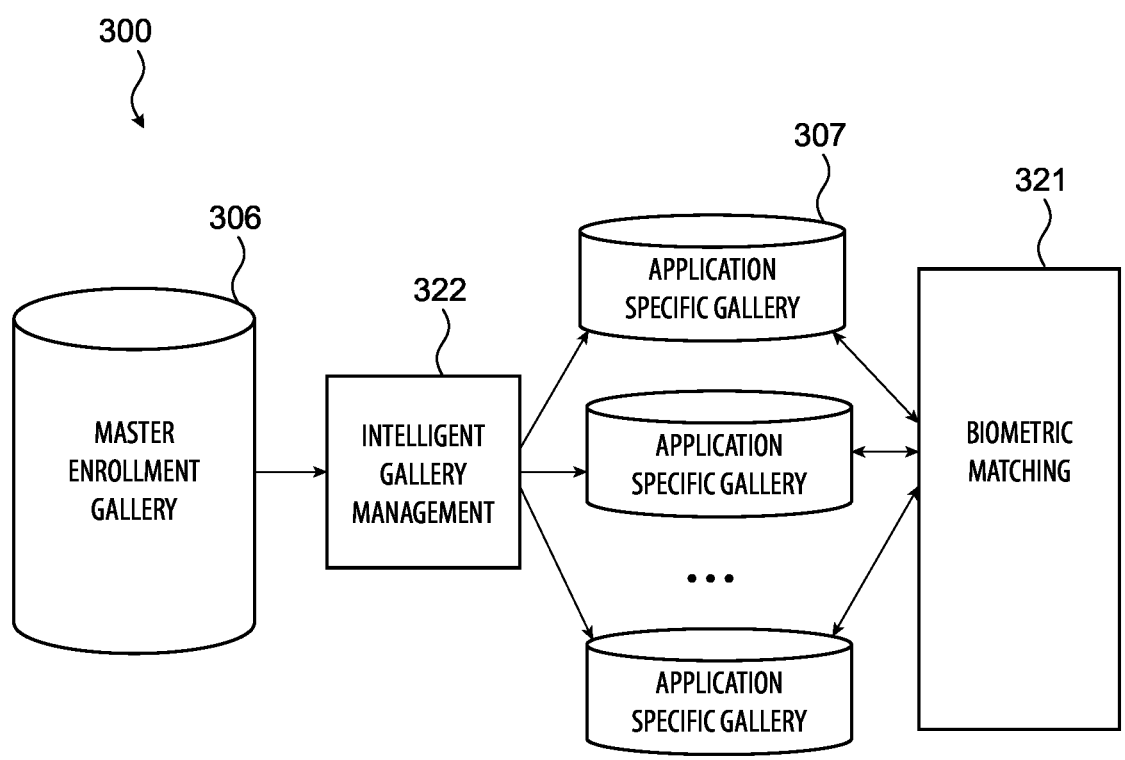
FIG. 3 depicts a process whereby IGM logic may be applied to create application specific galleries that may be used by biometric matching services.

FIG. 3 depicts a high-level process 300 whereby IGM 322 logic may be applied (such as on a continual basis) to create application specific galleries 307 that may be used by biometric matching services 321. The IGM 322 logic may understand the maximum size of the application specific galleries to achieve the required accuracy and latency results. The IGM 322 logic, using data that may be available from one or multiple external resources, may continually update the application specific galleries 307 to ensure that those potential identities from the master enrollment gallery 306 or "master gallery" that could possibly be identified at that point in time are available without including identities that could not possibly be identified at that point in time. By applying this constant logic, and managing the size of the application specific gallery 307, the associated biometric matching algorithm may match against a gallery that may be within the size constraints to achieve the accuracy and latency results that are desired.

Example

Given a master enrollment gallery 306 of 10 million identities where the desired biometric for identification is face. Utilizing a best-in-class facial recognition solution (which may be one that is commercially available), the maximum gallery size to achieve the same accuracy as one would get using an average commercially available fingerprint solution, may be 20,000. In this example, the application may be to use facial recognition to identify airline passengers as they approach a security checkpoint. The IGM, in this case, may be set to manage an application specific gallery of size no bigger than 20,000. The IGM 322 may be integrated with the airline's reservation systems, and may be restricted to identities in the application specific gallery that are associated with an airline reservation for that time window, and that airport. The time window may be variable and systematically modified to achieve the example maximum gallery size of 20,000.

Figure 4:
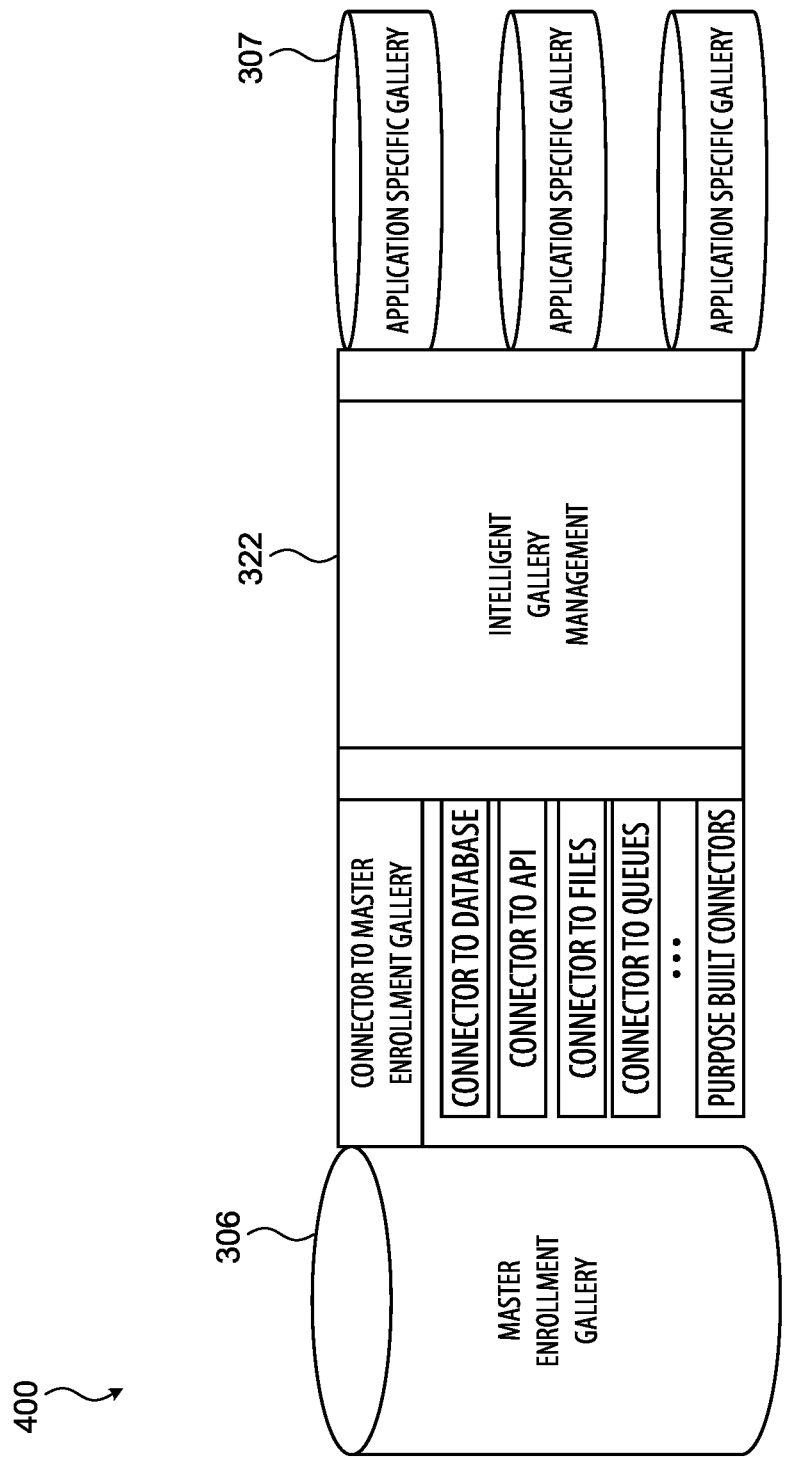
FIG. 4 depicts the IGM in more depth.

FIG. 4 depicts the IGM 322 in more depth 400. The IGM 322 may be configured, for each application specific gallery 307 that it serves, a maximum gallery size, and the criteria for an identity to be included in that gallery at a particular point in time. The IGM 322 may be connected directly to the master enrollment gallery 306 as well as one or more external systems or data sources. The job of the IGM 322 may be to continually keep all application specific galleries 306 up to date based on the data received from the external sources.

Example

An IGM 322 may be set up to serve 3 major league ballparks. Each may wish to use facial recognition for both security screening and ticket entry purposes. As a fan approaches the entry checkpoint, their photo may be taken and an identification operation may be performed against an application specific gallery 307 for that team and that game. So, there may be one application specific gallery 307 for baseball team A, one for baseball team B, and one for baseball team C. The IGM 322 may be configured so that all 3 application specific galleries may be no larger than 20,000. The IGM 322 may be connected to a common Master Enrollment Gallery 306. For baseball team A, the IGM 322 may also be connected to the baseball team A ticketing system via API (application programming interface), to the baseball team A Customer Relationship Management (CRM) system database, and to a purpose-built file reading utility that contains a VIP list. The baseball team A logic may be to restrict identities put in the application specific gallery to those that are a) in the VIP list, b) have been to a baseball team A game in the last 30 days, or c) are associated with tickets purchased for this particular game. Since tickets may be purchased at any time up to and including the start of the game, c) may be a real-time feed that continually or otherwise updates the baseball team A application specific gallery 307.

Example

An IGM 322 may be configured to identify members of a private bar. Since users under twenty-one years of age would not be legally permitted to enter the private bar, an application specific gallery 307 may be derived by pulling only information for people who are at least twenty-one years of age from a master enrollment gallery 306. As people under twenty-one years of age would not be permitted to be members, there would be no need to include their information in the application specific gallery 307 that is used to identify members and, thus, there would be no need to compare a biometric for a person to be identified against their information.

Further, the IGM 322 may have access to information regarding the current city in which people in the master enrollment gallery 306 are located. This information may be derived from check ins on social media, cell phone location services, transportation manifests, and so on. As people who are not located within a certain distance (such as a hundred miles) of the private bar could not be attempting to gain entry, the application specific gallery 307 may be derived by pulling only information for people who are at least twenty-one years of age and who are located within the certain distance of the private bar from the master enrollment gallery 306. In this way, the size of the application specific gallery 307 could be further reduced in order to improve identification time and accuracy as well as reduce storage space for the application specific gallery 307.

In some examples of such implementations, the application specific gallery 307 may be generated on a repeating basis, such as once per day. This may allow the application specific gallery 307 to be limited to people located within the certain distance at the same time that it allows for updating when people relocate.

In various examples of such implementations, the master enrollment gallery 306 and/or a larger application specific gallery 307 (which may be stored locally or remote) may be used as a backup to biometric identification using the application specific gallery 307. A person not included in the application specific gallery 307 may still be included in the master enrollment gallery 306 and/or the larger application specific gallery 307. If the person is not able to be identified using the application specific gallery 307, the master enrollment gallery 306 and/or the larger application specific gallery 307 may then be referenced. This may allow use of the smaller and faster application specific gallery 307 for the majority of identifications, resorting to the master enrollment gallery 306 and/or the larger application specific gallery 307 in the few cases when identification using the application specific gallery 306 is not possible. This may result in faster identification times than use of the master enrollment gallery 306 and/or the larger application specific gallery 307 all the time, though not as fast as if the application specific gallery were only used, while balancing the ability to identify more people.

Example

An IGM 322 may be configured to identify people registered with a grocery chain savings program. An application specific gallery 307 for each grocery store location may be derived by pulling people identified from stored information about the savings program as frequenting that grocery store location from a master enrollment gallery 306 including all registered members. People may then be identified by comparing a biometric obtained from them at checkout to the application specific gallery 307. If they are not included in the application specific gallery, the master enrollment gallery 306 may be referenced to identify them. That person may then be added to the application specific gallery 307 since evidence has been obtained that they have used that grocery store location. If a certain amount of time has elapsed since people have visited the grocery store location, they may be removed from the application specific gallery 307 for that grocery store location. In this way, the application specific gallery may be updated with age information in order to manage application specific gallery size and usefulness.

Example

An IGM 322 may be configured to first attempt to identify people using a first type of biometric, such as facial recognition, and then supplement this process by attempting to identify people using a second type of biometric, such as fingerprint, if the people cannot be identified by the first method. This may be used in a facility where identification may be performed upon entry and then subsequently for other uses, such as at an airport where people may first be identified at a security screening and then at businesses or gates within the airport once they have been screened. The two attempts may use different galleries. Upon first identification, the person may not be included in the gallery for the first type of biometric and may not be identified by comparing the first type of biometric obtained from them with the gallery for the first type of biometric. The second type of biometric may then be obtained and, if the person is identified by comparing the second type of biometric to the gallery for the second type of biometric, the first type of biometric obtained from the person may then be added to the gallery for the first type of biometric. When subsequent attempts are made to identify the person using the first type of biometric, they may be identified using the first type of biometric and the second type of biometric may not then be obtained.

Example

An IGM 322 may be configured to provide different tiers of service to different customers. For example, a venue may provide first, second, and third class entry for descending prices. A master enrollment gallery 306 may include all known people. A first application specific gallery 307 may be derived from the master enrollment gallery 306 by pulling information for people who have paid for first class entry. A second application specific gallery 307 may be derived from the master enrollment gallery 306 by pulling information for people who have paid for first or second class entry. A third application specific gallery 307 may be derived from the master enrollment gallery 306 by pulling information for people who have paid for first, second, or third class entry. Though people who have paid for first class entry could be identified using any of the three application specific galleries 306 and people who have paid for second class entry could be identified using either of the second or third application specific galleries 306, attempts may be made to identify a person using the first, second, and third application specific galleries 306 in sequence.

As the second is larger than the first and the third is larger than the second, more time may be used to compare against the second than the first and the third than the second. As such, quicker identification may be provided to people who have paid for first class entry than second, and similarly quicker identification may be provided to people who have paid for second class entry than third. This faster identification may be a perk that is provided to incentivize people to pay more to obtain higher classes of entry.

Figure 5:
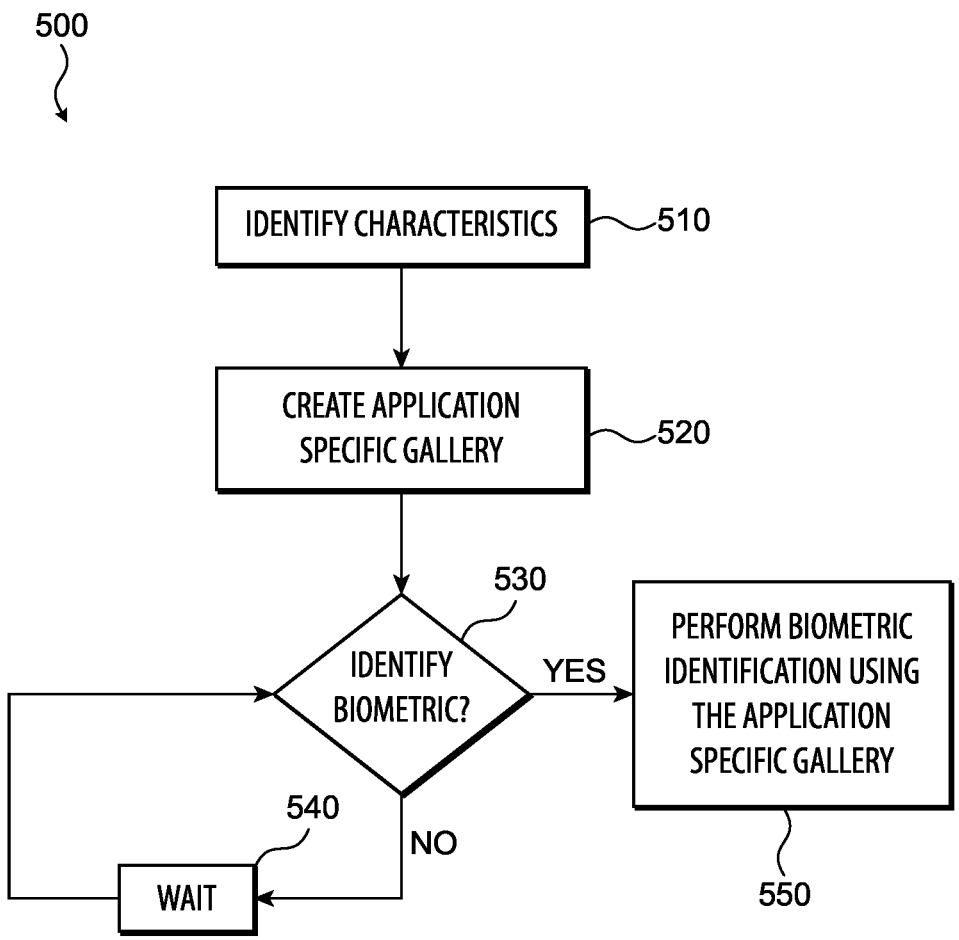
FIG. 5 depicts a flow chart illustrating a first example method of intelligent gallery management for biometrics.

A method 500 of intelligent gallery management for biometrics may include one or more of the following operations (such as is shown in operations 510-550 of the flow chart depicted in FIG. 5). Characteristics applicable to a subset of a master gallery that are relevant to an identification situation (such as security screening for a particular airport on a particular day, ticket validation for a particular ticketed event at a particular venue, and so on) may be identified. An application specific gallery may be created by obtaining the subset of the master gallery using the identified characteristics. Biometric identification (such as facial recognition) for the identification situation may then be performed using the application specific gallery rather than the master gallery. In this way, a device or system that performs such a method 500 may be improved as less time may be required for biometric identification, fewer device resources may be used, and so on.

For example, characteristics may be identified at 510, an application specific gallery may be created at 520, and a determination may be made at 530 whether or not to identify a biometric. If so, biometric identification may be performed at 550 using the application specific gallery. Otherwise, the flow may wait at 540 before again determining at 530 whether or not to identify a biometric.

In various examples, this example method 500 may be implemented as a group of interrelated software modules or components that perform various functions discussed herein. These software modules or components may be executed by one or more computing devices. For example, these software modules or components may be executed by the intelligent gallery management device 101 or the application device 109 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, 550 is illustrated and described as using the application specific gallery for biometric identification. However, in some situations, biometric information for a person may not be stored in the application specific gallery. In such a situation, if biometric identification using the application specific gallery fails, another gallery may be used for biometric identification. Various configurations are possible and contemplated without departing from the scope of the present disclosure.

In numerous embodiments, an intelligent biometric gallery management system may include at least one non-transitory storage medium that stores instructions and at least one processor. The at least one processor may execute the instructions to obtain a biometric gallery that includes biometric information for a population; create an application specific biometric gallery by pulling the biometric information for a subset of the population from the biometric gallery, the subset of the population associated with an application for which the biometric gallery can be used to identify people; and provide access to the application specific biometric gallery for biometric identification.

In some examples, the application specific biometric gallery may be a facial recognition biometric gallery and the at least one processor may create a fingerprint recognition gallery from the biometric gallery. In various examples, the application may be identifying ticketed people and the subset of the population may be the ticketed people.

In numerous examples, the subset of the population may be previously identified people. In some such examples, the at least one processor may remove the biometric information for a previously identified person upon elapse of a time period without subsequent identification.

In various examples, the application specific biometric gallery may be a first application specific biometric gallery, the at least one processor may create a second application specific biometric gallery from the biometric gallery that is larger than the first application specific biometric gallery, and the second application specific biometric gallery may be used for identification upon failure to identify using the first application specific biometric gallery.

Figure 6:
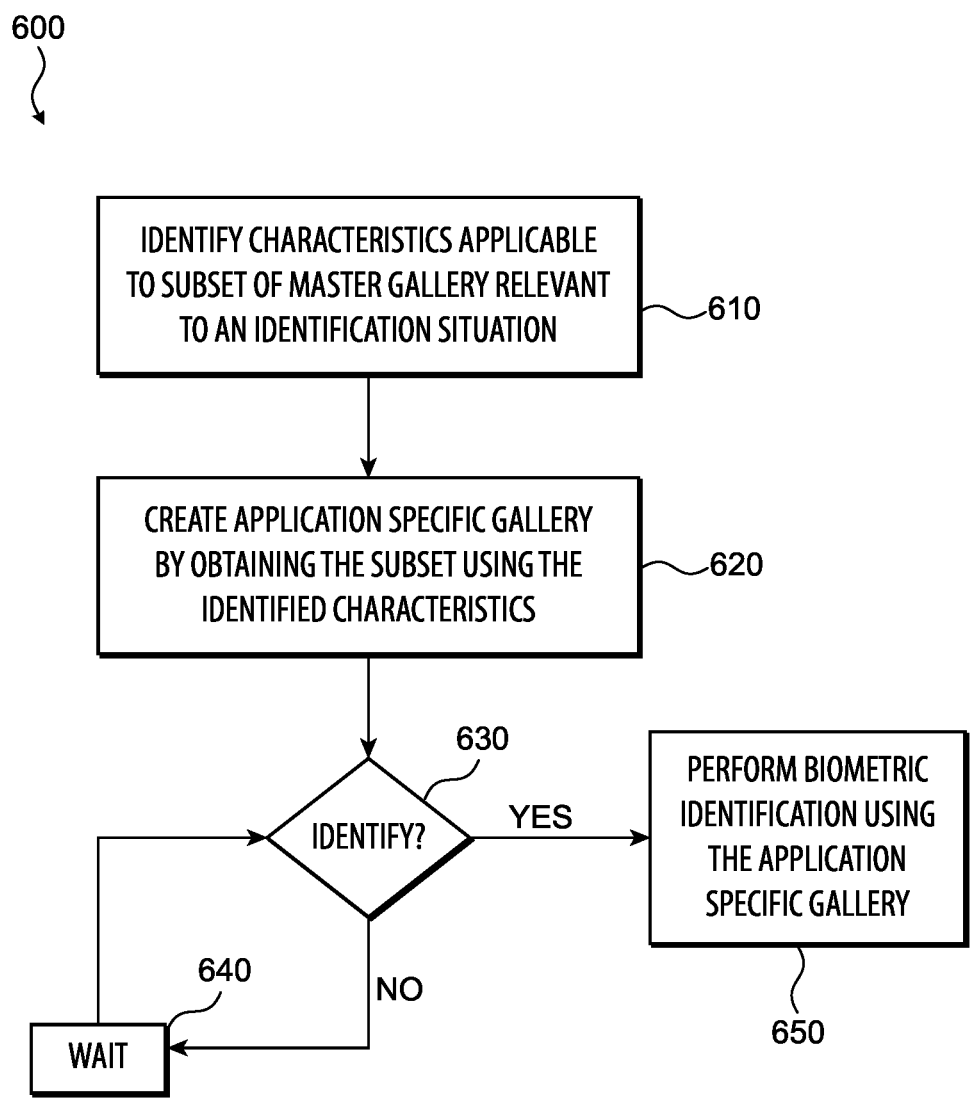
FIG. 6 depicts a flow chart illustrating a second example method of intelligent gallery management for biometrics.

Another method 600 of intelligent gallery management for biometrics may include one or more of the following operations (such as is shown in the operations 610-650 of the flow chart depicted in FIG. 6). A first gallery may be obtained that includes biometric and/or other information on a population of people. An application may be identified. A subset of the population of people may be identified based on the application. A second gallery may be derived from the first gallery by pulling the information for the subset of the population of people without pulling the information for the population of people not in the subset. Biometric identification for the application may then be performed using the second gallery rather than the first gallery. In this way, a device or system that performs such a method 600 may be improved as less time may be required for biometric identification, fewer device resources may be used, and so on.

For example, characteristics applicable to a subset of a master gallery (i.e., a first gallery) relevant to an identification situation may be identified at 610, an application specific gallery (i.e., a second gallery) may be created by obtaining the subset using the identified characteristics at 620, and a determination may be made at 630 whether or not to identify a biometric. If so, biometric identification may be performed at 650 using the application specific gallery. Otherwise, the flow may wait at 640 before again determining at 630 whether or not to identify a biometric.

In various examples, this example method 600 may be implemented as a group of interrelated software modules or components that perform various functions discussed herein. These software modules or components may be executed by one or more computing devices. For example, these software modules or components may be executed by the intelligent gallery management device 101 or the application device 109 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, 620 is illustrated and described as creating one application specific gallery. However, in various implementations, a number of different application specific galleries may be created. In some implementations, different application specific galleries may be created for different purposes. Various configurations are possible and contemplated without departing from the scope of the present disclosure.

In various embodiments, an intelligent biometric gallery management system may include at least one non-transitory storage medium that stores instructions and at least one processor. The at least one processor may execute the instructions to obtain a biometric gallery that includes biometric information for a population; ascertain an application for which to use the biometric gallery to identify people; identify a subset of the population based on the application; derive, from the biometric gallery, an application specific biometric gallery for the application that includes the biometric information for the subset of the population; and use the application specific biometric gallery to identify the people for the application.

In some examples, the at least one processor may determine a person was not identified using the application specific biometric gallery and communicate with the biometric gallery to identify the person. In various such examples, the application specific biometric gallery may be stored locally and the biometric gallery may be stored remotely. In other such examples, the at least one processor may add the biometric information for the person to the application specific biometric gallery.

In various examples, identification using the application specific biometric gallery may be more accurate than identification using the biometric gallery. In some examples, the application may be a first application; the application specific biometric gallery may be a first application specific biometric gallery; and the at least one processor may derive, from the biometric gallery, a second application specific biometric gallery for a second application. In numerous examples, the biometric gallery may be at least ten times larger than the application specific biometric gallery.

Figure 7:
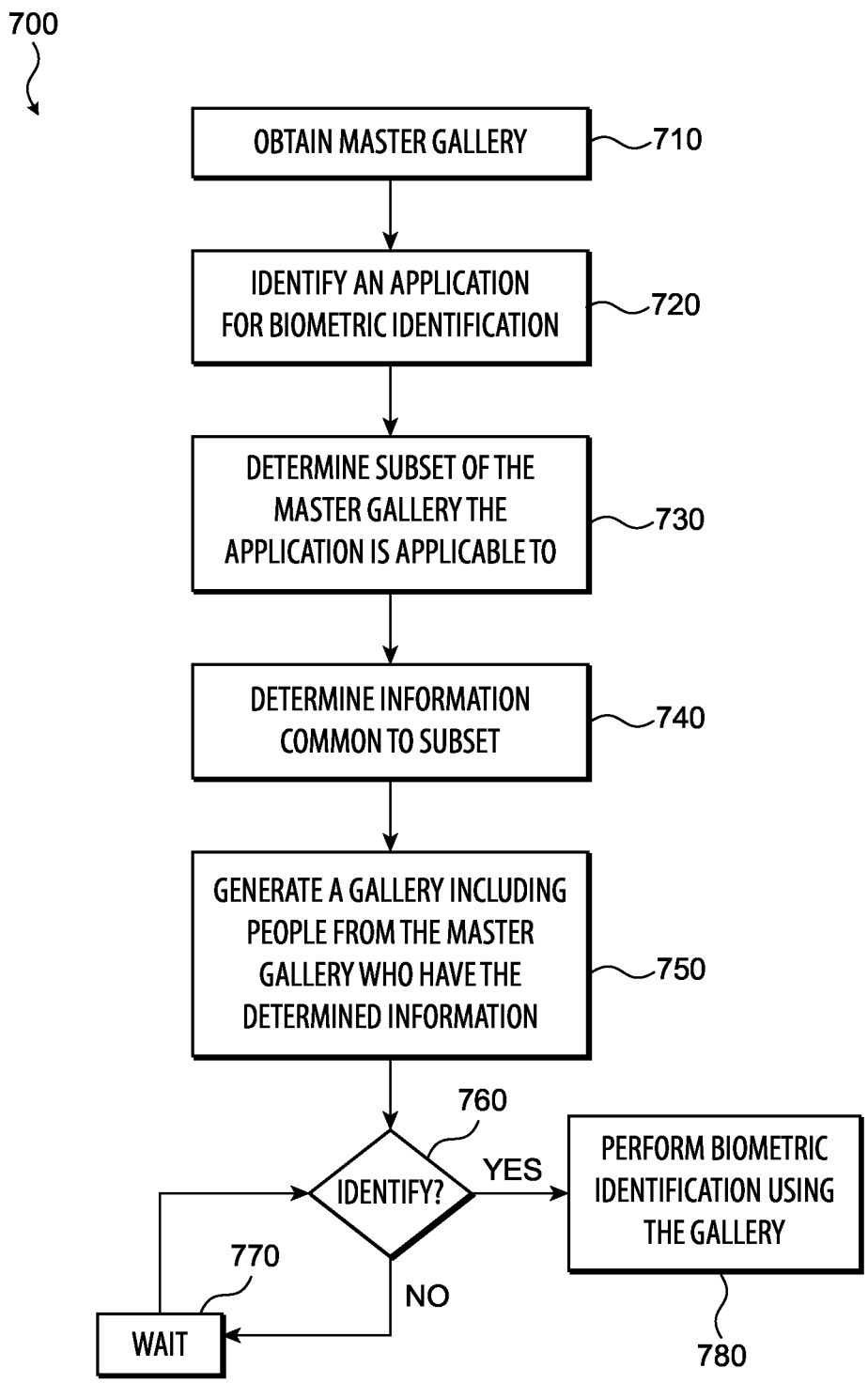
FIG. 7 depicts a flow chart illustrating a third example method of intelligent gallery management for biometrics.

Still another method 700 of intelligent gallery management for biometrics may include one or more of the following operations (such as is shown in operations 710-780 of the flow chart depicted in FIG. 7). A master gallery may be obtained. The master gallery may include information on a population of people. An application for biometric identification may be identified. A subset of the population of people that the application is applicable to may be determined. Information common to the subset but not the rest of the population of people may be determined. An application specific gallery may be generated by including people from the master gallery who have the determined information but not including people from the master gallery who do not have the determined information. Biometric identification for the identification situation may then be performed using the application specific gallery rather than the master gallery. In this way, a device or system that performs such a method 700 may be improved as less time may be required for biometric identification, fewer device resources may be used, and so on.

For example, a master gallery may be obtained at 710. An application for biometric identification may be identified at 720. A subset of a master gallery the application is applicable to may be determined at 730. Information common to the subset may be determined at 740. A gallery including people from the master gallery who have the determined information may be generated at 750. Then, a determination may be made at 760 whether or not to identify a biometric. If so, biometric identification may be performed at 780 using the gallery. Otherwise, the flow may wait at 770 before again determining at 760 whether or not to identify a biometric.

In various examples, this example method 700 may be implemented as a group of interrelated software modules or components that perform various functions discussed herein. These software modules or components may be executed by one or more computing devices. For example, these software modules or components may be executed by the intelligent gallery management device 101 or the application device 109 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, 720 is illustrated and described as obtaining a master gallery. However, in some implementations, the master gallery may be generated instead of being obtained. Various configurations are possible and contemplated without departing from the scope of the present disclosure.

In some embodiments, an intelligent biometric gallery management system may include at least one non-transitory storage medium that stores instructions and at least one processor. The at least one processor may execute the instructions to obtain a biometric gallery that includes biometric information for a population; ascertain an application for which to use the biometric gallery to identify people; determine data that is common to a subset of the population to which the application is applicable and is not common to a remainder of the population; derive, from the biometric gallery, an application specific biometric gallery for the application that includes the biometric information that is associated with the data; and provide access to the application specific biometric gallery for biometric identification.

In various examples, the at least one processor may update the application specific biometric gallery. In numerous examples, the at least one processor may add a portion of the biometric information from the biometric gallery to the application specific biometric gallery. In some such examples, the at least one processor may add the portion of the biometric information from the biometric gallery to the application specific biometric gallery upon occurrence of a change to the application, a change to the biometric gallery, or elapse of a time period.

In numerous examples, the at least one processor may remove a portion of the application specific biometric gallery. In some such examples, the at least one processor may remove the portion of the application specific biometric gallery after adding to the application specific biometric gallery. In various such examples, the at least one processor may remove the portion of the application specific biometric gallery to maintain a minimum gallery size.

The techniques discussed herein regarding reduced gallery size by generating an application specific biometric gallery from a master gallery may be more applicable to biometric identification and may not provide as much improvement for biometric verification. This may be due to the nature of biometric verification involving matching against information for just one person to verify that person is who they purport to be. Contrasted with biometric identification where the identity of the person is unknown until identification is performed, and involving matching against information of potentially a large number of people, biometric verification may not be improved by reducing information that biometrics or various digital representations thereof are matched against.

In the context of this disclosure, terms such as "biometric information," "biometric data," "information about biometrics," "data regarding biometrics," and/or similar terms may refer to any kind of information related to biometrics. This may include, but is not limited to, full and/or partial images of biometrics, digital representations of biometrics, hashes, encodings of biometrics, and/or any other digital or other data structure that may indicate and/or store information regarding one or more biometrics.

In some implementations, the method may further include updating the application specific biometric gallery based on the detection of one or more conditions. Such conditions may include, but are not limited to, failed biometric identification attempts, changes in circumstances that were used to determine the subset, elapse of a time period, changes to the master gallery, changes to the application, and so on. Various arrangements are possible and contemplated without departing from the scope of the present disclosure.

Aspects of the present disclosure may be performed by one or more devices, such as one or more computing devices, that may be configured as part of a system. For example, one or more computing devices that perform one or more aspects of this disclosure may be part of a cloud computing system, cooperative computing arrangement, and so on. Such devices may include one or more processing units, one or more non-transitory storage media (which may take the form of, but is not limited to, a magnetic storage medium; optical storage medium; magneto-optical storage medium; read only memory; random access memory; erasable programmable memory; flash memory; and so on), and/or other components. The processing unit may execute one or more instructions stored in the non-transitory storage medium to perform one or more processes that utilize one or more of the techniques disclosed herein for intelligent gallery management for biometrics.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and and/or other personal data should comply with well-established privacy policies and/or privacy practices. Particularly, such entities should implement and consistently use privacy policies and practices that are generally recognized as meeting or exceeding industry or governmental requirements for maintaining securely and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and and/or other personal data should implement and consistently prevent any collection, analysis, storage, and/or other use of any biometric and/or other personal data blocked by the person from whom such biometric and/or other personal data is derived.

As described above and illustrated in the accompanying figures, the present disclosure relates to techniques for intelligent gallery management for biometrics. A first gallery may be obtained that includes biometric and/or other information on a population of people. An application may be identified. A subset of the population of people may be identified based on the application. A second gallery may be derived from the first gallery by pulling the information for the subset of the population of people without pulling the information for the population of people not in the subset. Biometric identification (such as facial recognition) for the application may then be performed using the second gallery rather than the first gallery. In this way, a device or system that performs such a method may be improved as less time may be required for biometric identification, fewer device resources may be used, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system, comprising:
    at least one non-transitory storage medium that stores instructions; and
    at least one processor that executes the instructions to:
        obtain data from a person indicating that the person is at a first location, the data comprising alphanumeric information;
        upon determining from the data that the person is at the first location, load information for the person into a biometric gallery from a main gallery;
        obtain a digital representation of a biometric for the person;
        determine an identity of the person at least by comparing the digital representation of the biometric to the biometric gallery; and
        perform an action using stored information associated with the identity; wherein:
    the biometric gallery includes biometric information for fewer people than the main gallery; and
    the biometric gallery is dedicated to biometric identification performed at the first location.

2. The system of claim 1, wherein the action comprises initiating access to stored financial information associated with the identity for processing a transaction.

3. The system of claim 2, wherein the access to the stored financial information is initiated related to a checkout at a store.

4. The system of claim 2, wherein the first location comprises a grocery store.

5. The system of claim 2, wherein the at least one processor obtains the information from at least one server at a second location.

6. The system of claim 2, wherein the data is associated with an account that corresponds to the person.

7. The system of claim 2, wherein the stored financial information corresponds to a card.

8. The system of claim 2, wherein the data corresponds to a savings program.

9. The system of claim 2, wherein the at least one processor further determines the identity of the person by:
    determining that the identity of the person cannot be determined by comparing the digital representation of the biometric to the biometric gallery; and comparing the digital representation of the biometric to an additional biometric gallery.

10. The system of claim 9, wherein the additional biometric gallery is located remote from the biometric gallery.

11. The system of claim 1, wherein the data is obtained from a mobile electronic device.

12. The system of claim 1, wherein the stored information comprises an age of the person.

13. The system of claim 1, wherein the data is encoded.

14. The system of claim 1, wherein the digital representation of the biometric comprises at least a portion of a hand.

15. A method, comprising:
obtaining data indicating that a person is at a first location, the data comprising alphanumeric information;
upon determining from the data that the person is at the first location, loading information for the person into a biometric gallery from a main gallery;
determining an identity of the person at least by comparing a digital representation of a biometric for the person to the biometric gallery; and
performing an action using stored information associated with the identity; wherein:
the biometric gallery includes biometric information for fewer people than the main gallery; and
the biometric gallery is dedicated to biometric identification performed at the first location.

16. The method of claim 15, wherein the data is obtained from the person.

17. The method of claim 15, wherein the action comprises initiating processing of a transaction.

18. A computer program product, comprising:
first instructions stored in at least one non-transitory medium and executable by at least one processing unit to determine to obtain data from a person, the data comprising alphanumeric information;
second instructions stored in the at least one non-transitory medium and executable by the at least one processing unit to use the information to determine that the person is at a first location;
third instructions stored in the at least one non-transitory medium and executable by the at least one processing unit to, upon determining from the data that the person is at the first location, load information for the person into a biometric gallery from a main gallery; and
fourth instructions stored in the at least one non-transitory medium and executable by the at least one processing unit to perform an action using stored information associated with the identity in response to determining an identity of the person at least by comparing the digital representation of the biometric to the biometric gallery; wherein:
the biometric gallery includes biometric information for fewer people than the main gallery; and
the biometric gallery is dedicated to biometric identification performed at the first location.

19. The computer program product of claim 18, wherein the first location comprises a grocery store.

20. The computer program product of claim 19, further comprising fifth instructions stored in the at least one non-transitory medium and executable by the at least one processing unit to obtain the information from at least one server at a second location.

* * * * *